(12) United States Patent
Proud

(10) Patent No.: US 8,872,027 B2
(45) Date of Patent: Oct. 28, 2014

(54) FILLER ASSEMBLY FOR CABLE GLAND

(75) Inventor: Samuel Liam Proud, Tyne & Wear (GB)

(73) Assignee: CMP Products Limited, Cramlington (GB)

( * ) Notice: Subject to any disclaimer, the term of this patent is extended or adjusted under 35 U.S.C. 154(b) by 0 days.

(21) Appl. No.: 13/391,539

(22) PCT Filed: Jun. 14, 2010

(86) PCT No.: PCT/GB2010/050989
§ 371 (c)(1),
(2), (4) Date: May 2, 2012

(87) PCT Pub. No.: WO2011/021016
PCT Pub. Date: Feb. 24, 2011

(65) Prior Publication Data
US 2012/0205023 A1  Aug. 16, 2012

(30) Foreign Application Priority Data

Aug. 21, 2009  (EP) .................................. 09168429
Aug. 21, 2009  (EP) .................................. 09168430
Mar. 15, 2010  (GB) .................................. 1004216.6
Jun. 7, 2010  (GB) .................................. 1009450.6

(51) Int. Cl.
*H02G 3/02* (2006.01)
*H02G 15/04* (2006.01)
*H02G 15/013* (2006.01)
*H02G 3/06* (2006.01)

(52) U.S. Cl.
CPC ........... *H02G 15/013* (2013.01); *H02G 3/0691* (2013.01); *H02G 15/046* (2013.01); *H02G 3/0675* (2013.01)
USPC ............ 174/76; 174/667; 174/77 R; 174/653; 222/1; 222/92; 222/145.1

(58) Field of Classification Search
USPC ......... 222/92, 94, 95, 103, 107, 145.1, 145.5, 222/145.6, 1; 439/271–277, 586, 589, 604
See application file for complete search history.

(56) References Cited

U.S. PATENT DOCUMENTS 2,530,381 A * 11/1950 Donohue, Jr. .................... 174/18
2,590,160 A * 3/1952 Dixon .............................. 174/76

(Continued)

FOREIGN PATENT DOCUMENTS

CA   1279707 C   1/1991
CA   1333192 C   11/1994

(Continued)

OTHER PUBLICATIONS

International Search Report and Written Opinion under date of Sep. 16, 2010 in connection with PCT/GB2010/050989.

(Continued)

*Primary Examiner* — Paul R Durand
*Assistant Examiner* — Randall Gruby
(74) *Attorney, Agent, or Firm* — Quarles & Brady LLP

(57) ABSTRACT

A dispenser apparatus (2) for a curable liquid material is disclosed. The apparatus comprises a flexible bag (8) defining a first compartment (10) for accommodating a first component of a curable liquid material, and a second compartment (12) for accommodating a second component of the curable liquid material and adapted to communicate with the first chamber to enable mixing of the first and second components to initiate curing of the curable liquid material. A first clamp (14) temporarily prevents mixing of the first and second components, and an elongate nozzle (16) communicates with the second compartment to dispense the mixed curable liquid material therefrom. A second clamp (18) temporarily prevents passage of the curable liquid material from the second compartment to the nozzle.

19 Claims, 2 Drawing Sheets

(56) References Cited

U.S. PATENT DOCUMENTS

| | | | | |
|---|---|---|---|---|
| 2,913,260 | A * | 11/1959 | Givens | 285/151.1 |
| 2,957,038 | A * | 10/1960 | Greenidge et al. | 174/23 R |
| 3,567,843 | A * | 3/1971 | Collins et al. | 174/51 |
| 3,617,614 | A * | 11/1971 | Henry | 174/77 R |
| 4,015,329 | A * | 4/1977 | Hutchison | 29/858 |
| 4,332,975 | A * | 6/1982 | Dienes | 174/76 |
| 4,379,204 | A * | 4/1983 | Perrault et al. | 174/653 |
| 4,493,522 | A * | 1/1985 | Law | 439/271 |
| 4,549,037 | A * | 10/1985 | Bawa et al. | 174/667 |
| 4,608,454 | A * | 8/1986 | Lackinger | 174/653 |
| 4,692,563 | A * | 9/1987 | Lackinger | 174/654 |
| 4,751,350 | A * | 6/1988 | Eaton | 174/87 |
| 5,113,037 | A * | 5/1992 | King et al. | 174/87 |
| 5,208,427 | A * | 5/1993 | Couto et al. | 174/653 |
| 5,310,963 | A * | 5/1994 | Kennelly | 174/667 |
| 5,321,205 | A * | 6/1994 | Bawa et al. | 174/655 |
| 5,600,094 | A * | 2/1997 | McCabe | 174/653 |
| 5,621,191 | A * | 4/1997 | Norris et al. | 174/653 |
| 5,691,505 | A * | 11/1997 | Norris | 174/51 |
| 6,242,700 | B1 * | 6/2001 | Smith | 174/77 R |
| 6,259,029 | B1 * | 7/2001 | Hand | 174/74 R |
| 6,812,406 | B2 * | 11/2004 | Hand | 174/667 |
| 7,507,105 | B1 * | 3/2009 | Peters et al. | 439/374 |
| 7,736,165 | B2 * | 6/2010 | Bukovnik et al. | 439/276 |
| 8,170,390 | B2 * | 5/2012 | Hand | 385/134 |
| 8,288,667 | B2 * | 10/2012 | Chiou | 174/652 |
| 8,367,944 | B2 * | 2/2013 | Chiou | 174/520 |
| 8,490,513 | B2 * | 7/2013 | Chiou | 74/502.4 |
| 8,581,120 | B2 * | 11/2013 | Winship | 174/667 |
| 2002/0066518 | A1 | 6/2002 | Bukovnik et al. | |
| 2003/0226680 | A1 * | 12/2003 | Jackson | 174/65 SS |
| 2004/0069522 | A1 * | 4/2004 | Jackson | 174/65 SS |
| 2008/0262408 | A1 | 10/2008 | Krauss et al. | |
| 2010/0003001 | A1 * | 1/2010 | Hand | 385/138 |
| 2010/0108020 | A1 * | 5/2010 | Miretti | 123/198 D |
| 2011/0033165 | A1 * | 2/2011 | Guest | 385/138 |
| 2012/0097445 | A1 * | 4/2012 | Gadda | 174/84 R |
| 2012/0142207 | A1 * | 6/2012 | Duval et al. | 439/272 |
| 2012/0292100 | A1 * | 11/2012 | Thomas | 174/652 |
| 2013/0059469 | A1 * | 3/2013 | Kawakita et al. | 439/589 |
| 2013/0112475 | A1 * | 5/2013 | Magno et al. | 174/77 R |
| 2013/0118803 | A1 * | 5/2013 | Magno, Jr. | 174/77 R |
| 2013/0129289 | A1 * | 5/2013 | Roland | 385/102 |
| 2014/0030903 | A1 * | 1/2014 | Magno et al. | 439/279 |
| 2014/0041939 | A1 * | 2/2014 | Schlachter et al. | 174/77 R |

FOREIGN PATENT DOCUMENTS

| | | | |
|---|---|---|---|
| DE | 20 2005 000854 | U1 | 6/2005 |
| DE | 20 2005 004135 | U1 | 6/2005 |
| EP | 0 434 105 | A1 | 6/1991 |
| EP | 1958608 | A1 | 8/2008 |
| GB | 765 082 | A | 1/1957 |
| GB | 1335047 | | 10/1973 |
| GB | 2 074 395 | A | 10/1981 |
| KR | 2001 0109284 | A | 12/2001 |
| WO | 0204843 | A2 | 1/2002 |
| WO | 2004047248 | A1 | 6/2004 |
| WO | 2007073526 | A2 | 6/2007 |
| WO | WO 2008029165 | A2 * | 3/2008 ............. H02G 15/04 |

OTHER PUBLICATIONS

European Patent Office; European Search Report; Appln. No. EP 09168429.0; dated Jan. 28, 2010.

European Patent Office; European Search Report; Appln. No. EP 09168430.8; dated Feb. 9, 2010.

United Kingdom Intellectual Property Office; Examination Report; Appln. No. GB1202969.0; dated May 8, 2013.

CMP Products, Catalog p. 59, Sep. 2007, Newcastle Upon Tyne, England.

EGS Electrical Group, Instruction for Unilet Sealing Fittings Approved For Use With: Appleton Kwiko® A And Crouse-Hinds Chico® A Sealing Cement, dated Jul. 1, 2009, 4 pages.

* cited by examiner

FILLER ASSEMBLY FOR CABLE GLAND

CROSS-REFERENCE TO RELATED APPLICATIONS

This application claims priority to PCT International Application No. PCT/GB2010/050989 filed on Jun. 14, 2010, which claims priority to European Patent Application No. 09168430.8 filed on Aug. 21, 2009, European Patent Application No. 09168429.0 filed on Aug. 21, 2009, Great Britain Patent Application 1004216.6 filed on Mar. 15, 2010 and Great Britain Patent Application 1009450.6 filed on Jun. 7, 2010, all of which are fully incorporated by reference herein.

The present invention relates to a filler assembly for cable glands and relates particularly, but not exclusively, to such a filler assembly for filling cable glands for use in hazardous areas.

Many cable glands for use in connecting a cable to an enclosure in hazardous areas need to be filled with a compound which provides a barrier against the effects of an explosion occurring within the enclosure to which the cable gland is attached. The barrier is typically formed from a two-part clay-filled epoxy compound. The two component parts of the compound need to be thoroughly mixed with each other prior to fitting into the gland, and the resulting putty like material needs to be packed between the individual conductors in the cable. Such an arrangement is disclosed in GB 2258350.

This known arrangement suffers from a number of drawbacks. Firstly, the cure time of the putty like material is chosen to be relatively long, in order to enable it to be manipulated into the spaces between the individual conductors before curing becomes advanced. As a result, the filled cable assembly must be left undisturbed for a significant period, usually several hours, especially if mixed at low temperatures. Also, the components of the filler material sometimes contain hazardous materials which become harmless when the filler material is mixed. Persons mixing the components of the putty like filler material may come into contact with these hazardous materials during mixing, and air can become trapped within the cable gland by the filler material which may cause the barrier formed by the filler material to fail in the event of an explosion. Filling of the cable gland is also relatively difficult, especially in the case of small cable glands.

GB 765082 discloses an arrangement for insulating a splice between two stranded connectors in which resinous material is introduced from a capsule having an elongate tip. However, this arrangement suffers from the drawback that it is not suitable for filling cable glands, since the introduction of a material which is sufficiently fluid to penetrate between the individual conductors of a cable would cause material to flow along the conductors along the interior of the cable, which would prevent the cable gland from being sufficiently filled to expel all of the air from the cable gland to avoid air voids.

Preferred embodiments of the present invention seek to overcome one or more of the above disadvantages of the prior art.

According to an aspect of the present invention, there is provided a filler assembly for filling a cable gland, having a plurality of cores of at least one cable extending therethrough, with curable liquid material, the assembly comprising:

(a) a dispenser apparatus for a curable liquid material, the apparatus comprising:

a body adapted to define at least one first chamber for accommodating a first component of a curable liquid material and at least one second chamber for accommodating a second component of said curable liquid material and adapted to communicate with at least one said first chamber to enable mixing of said first and second components to initiate curing of said curable liquid material;

first barrier means for temporarily preventing mixing of said first and second components;

elongate dispenser means adapted to communicate with at least one said second chamber and to dispense said mixed curable liquid material therefrom between a plurality of cores of at least one cable; and second barrier means for temporarily preventing passage of said curable liquid material from the or each said second chamber to said dispenser means; and (b) at least one barrier member for restricting the extent of penetration of said curable liquid material along said cores.

By providing elongate dispenser means to dispense mixed curable liquid material and second barrier means for temporarily preventing passage of the curable liquid material to said dispenser means, this provides the advantage that the first and second components of the curable liquid material can be mixed in a sealed container comprising the first and second compartments, thus enabling the user to avoid coming into contact with harmful components of the curable liquid material. As a result of the provision of elongate dispenser means, dispensing of the curable liquid can be more carefully controlled, as a result of which less viscous and faster curing liquid material can be used than in the prior art. This therefore provides the advantage of enabling more rapid formation of a filled cable gland incorporating the material, while also allowing the liquid material to be introduced into the cable gland in such a way that the air is expelled from the cable gland to avoid air voids, which could lead to failure of the cable gland in the event of an explosion. In addition, with the present invention, the curable material can be dispensed into the assembled gland, i.e. the cable gland can be filled with the conductors of the cable in a connected state, as a result of which the electrical integrity of the joint can be ensured, whereas the putty like compound of the known arrangement must be moulded around the conductors of the cable with the gland disassembled, as a result of which the cable cores can not be electrically connected. The provision of at least one barrier member for restricting the extent of penetration of said curable liquid material along the cable cores provides the advantage of enabling highly flowable curable liquid material to be used, while also enabling filling of the cable gland.

The body may be flexible.

This provides the advantage of making the apparatus easier and less expensive to manufacture.

The first and/or second barrier means may comprise at least one releasable clamp.

The assembly may further comprise a first component of a curable liquid material in at least one said first chamber, and a second component of said curable liquid material in at least one said second chamber.

The curable liquid material may be adapted to change colour as a result of curing thereof.

This provides the advantage of providing a visual indicator to the user when the cable gland filling process is complete.

The assembly may further comprise a cover member for covering an external screw thread of a cable gland to prevent said curable liquid material coming into contact with said screw thread.

The cover member may be adapted to prevent curable liquid material from penetrating an end face of the cable gland.

At least one said barrier member may comprise a respective flexible member having at least one aperture therethrough for engaging at least one core of at least one cable.

At least one said barrier member may have a respective tapering portion.

According to another aspect of the present invention, there is provided a method of filling a cable gland with curable liquid material by means of an assembly according to any one of the preceding claims, the method comprising:

locating at least one said barrier member in the cable gland; and locating an outlet of said dispenser means in said cable gland and dispensing curable liquid material therefrom so as to expel air from the cable gland.

The step of locating at least one said barrier member in the cable gland may comprise locating at least one said barrier member around at least one said core of at least one said cable.

A preferred embodiment of the invention will now be described, by way of example only and not in any limitative sense, with reference to the accompanying drawings in which.

Figure 1:
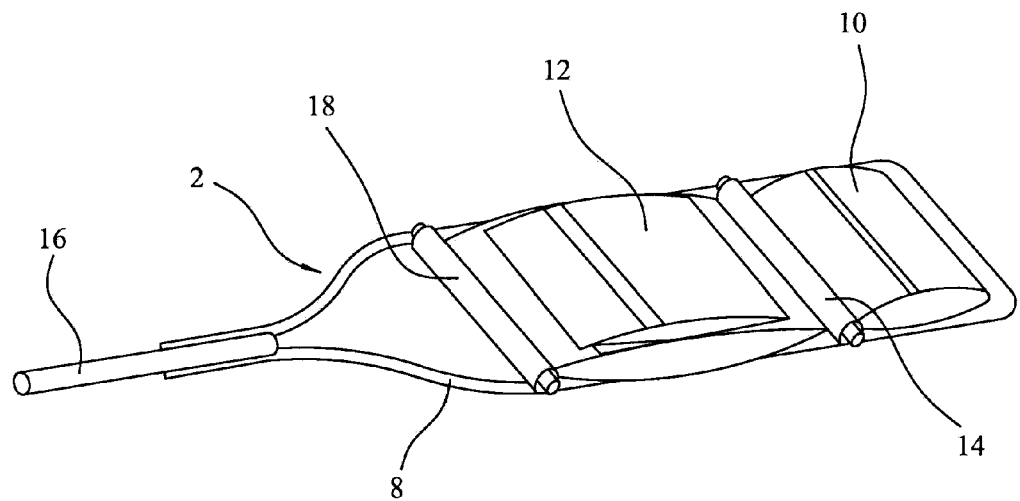
FIG. 1 is a perspective view of a dispensing apparatus embodying the present invention.

Referring to FIG. 1, a dispenser apparatus 2 embodying the present invention and for use in filling a cable gland 4 (FIG. 2) with curable liquid material 6 comprises a body of suitable transparent flexible plastics material defining a flexible bag 8 having a first compartment 10 for accommodating a first component of a liquid curable material 6, and a second compartment 12 for accommodating a second component of the material 6. A first clamp 14 temporarily separates the first compartment 10 and second compartment 12 to thereby prevent mixing of the first and second components of the material 6. The first and second components are coloured differently (for example blue and yellow) so that thorough mixing of the first and second components produces a green liquid, thereby providing a visual indication when thorough mixing of the first and second components has occurred. Mixing of the first and second components together causes gelling of the material and initiates curing of the curable liquid material 6.

The dispenser apparatus 2 is also provided with an elongate hollow nozzle 16 extending from the second compartment 12 such that dispensing of the mixed curable liquid material can be carefully controlled. In particular, the nozzle 16 can be inserted a considerable distance into the cable gland 4 and between individual core conductors 20 of the core of a cable 22 attached to the cable gland 4 (FIG. 2) so that the liquid material 6 can be highly flowable and fast-curing, as a result of which the cable gland 4 can be rapidly filled and air entrapment by the liquid material 6 minimised. A second clamp 18 temporarily prevents material flowing from the second compartment 12 into the nozzle 16, so that dispensing of the material 6 can be prevented until thorough mixing together of the first and second components has occurred.

The flexible bag 8 is formed from two sheets of material welded together along all but one of their edges to form a bag having an open mouth, which is then mounted to the nozzle 16. The second clamp 18 is then mounted to the bag adjacent to the nozzle 16, and the second component of the material 6 is dispensed into the second compartment 12. The first clamp 14 is then mounted to the bag to seal the second component in the second compartment 12, and the first component is then dispensed into the first compartment 10. The open edge of the bag is then sealed to seal the first component in the first compartment 10.

Figure 2:
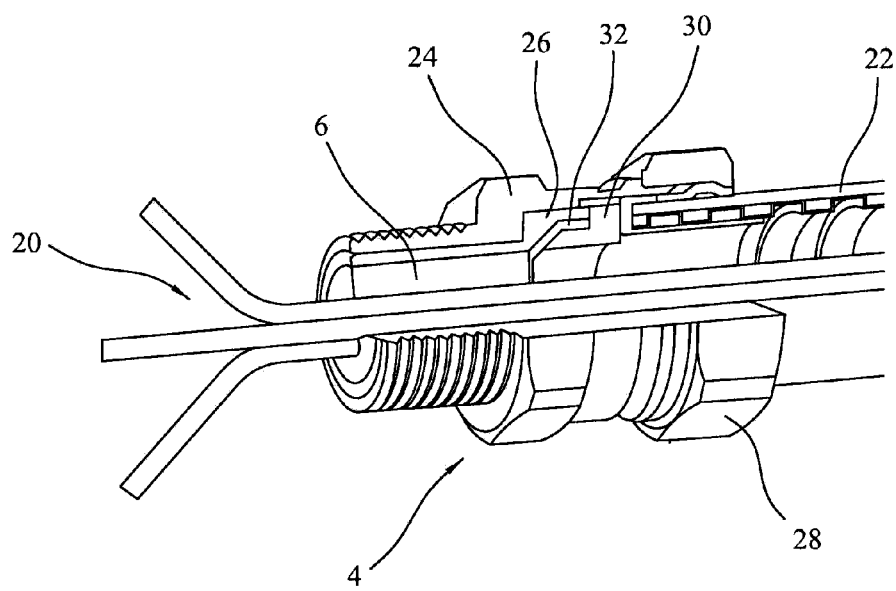
FIG. 2 is a partially cut away perspective view of a cable gland having a filler formed using the apparatus of FIG. 1.
Figure 3:
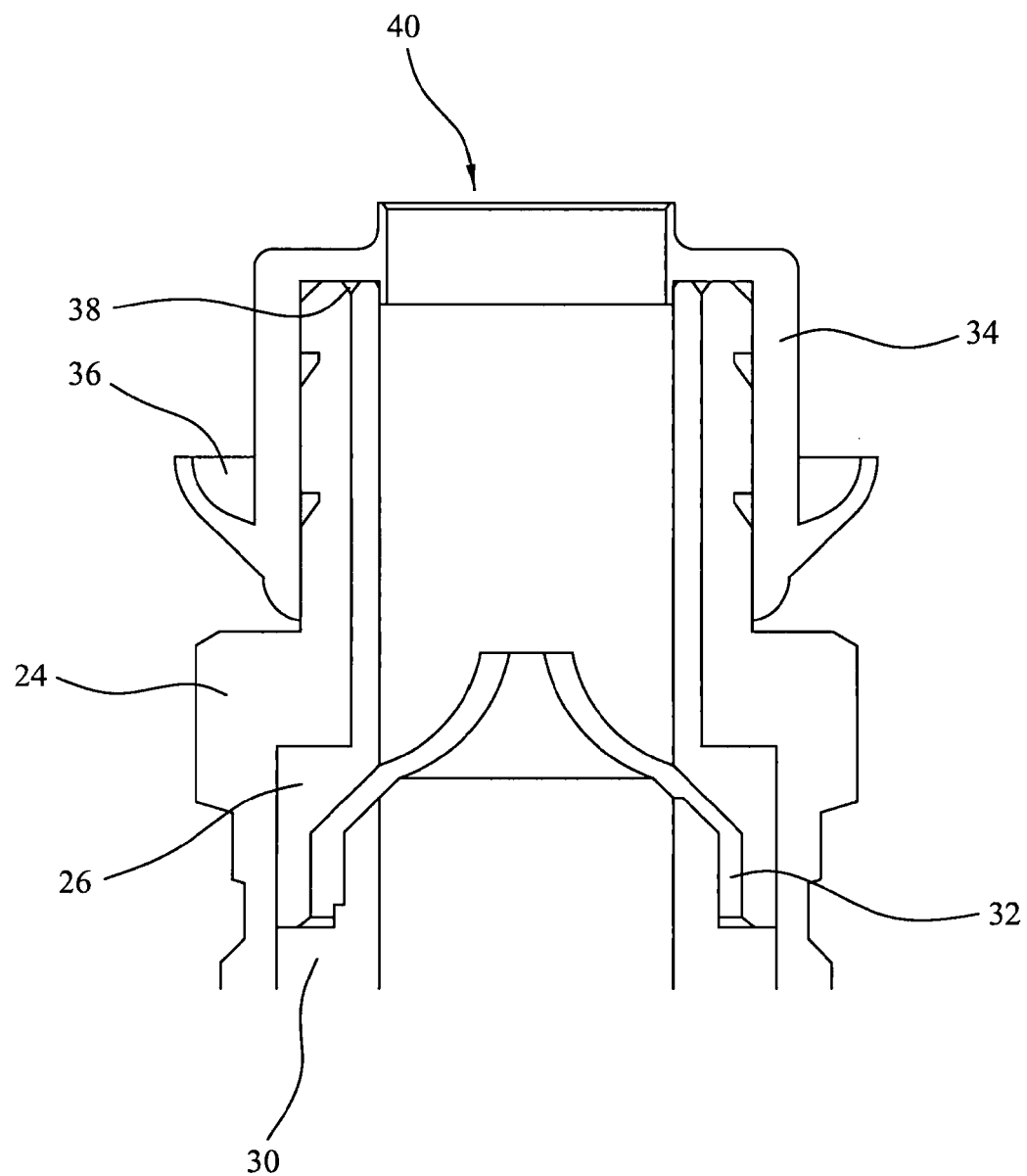
FIG. 3 is a cross sectional view of the filled cable gland of FIG. 2 with a thread protector in place.

Referring to FIGS. 2 and 3, the cable gland 4 to be filled by means of the dispenser apparatus 2 of FIG. 1 comprises a threaded outer connector 24 for threaded connection to an enclosure (not shown) and a compound tube 26 rotatably mounted within the outer connector 24. A cable connector 28 is mounted to the end of the cable 22 and is connected to the outer connector 24 by means of cooperating screw threads (not shown).

A ring 30 abuts the cable connector 28 and a flexible seal 32 is located around the core conductors 20 of the cable 22 and compressed between the compound tube 26 and ring 30 for limiting the extent of penetration of curable material 6 into the cable gland 4 before curing of the curable material 6. The flexible seal 32 comprises a generally frusto-conical body of elastomeric material having an aperture (not shown) therethrough for engaging the core conductors 20 of the cable 22. The aperture in the seal 32 is sized such that it stretches to pass around the core conductors 20 to tightly engage the core conductors 20 to form a reasonably effective barrier to passage of the material 6 along the space defined between the core conductors 20 and the compound tube 26.

Referring to FIG. 3, a thread protector 34 formed of elastomeric material such as rubber is located over the external screw thread of the outer connector 24 of the cable gland 4 prior to filling of the cable gland with curable material 6. The thread protector 34 has a hollow rim 36 for catching excess curable material 6 which may flow out of end 40 of the cable gland 4 during the filling procedure, and an inner circular rim 38 which prevents penetration of curable material 6 into the gap between the outer connector 24 and the compound tube 26. This ensures that the compound tube 26 complete with cable connectors 20 can be removed from the outer connector 24 after curing of the material 6.

The process of filling the cable gland 4 of FIGS. 2 and 3 by means of the dispenser apparatus 2 of FIG. 1 will now be described.

In order to fill the core of the cable gland 4 with curable material, the flexible seal 32 initially placed over the core conductors 20 of the cable 22 so that the seal 32 tightly grips the core conductors 20. The outer connector 24 with compound tube 26 are then mounted to the ring 30 and cable connector 28 to compress the seal 32 between the ring 30 and compound tube 26. As a result, the flexible seal 32 acts as a barrier to penetration of the curable liquid material 6 into the interior of the cable gland 4.

The first clamp 14 is then removed from the dispenser apparatus 2 and the second clamp 18 left in place, to enable thorough mixing of the first and second components of the curable liquid material 6. The first and second components are coloured blue and yellow respectively, a result of which the curable liquid material 6 is bright green when it is thoroughly mixed. The second clamp 18 is then removed, and the outlet of the nozzle 16 is placed at a location near the seal 32. The liquid material 6 is then dispensed through the nozzle 16 into the space between the core conductors 20 of the cable 22 and into the space around the core conductors 20 inside the compound tube 26 of the cable gland 4, where its movement along the axis of the cable gland 4 is restricted by the flexible seal 32. The location of the outlet of the nozzle 16 near the seal 32 causes air to be expelled from the cable gland when the curable liquid material 6 is dispensed from the nozzle 16. The seal 32 provides a sufficient barrier to penetration of the material 6 to hold back the curable material until it begins to gel and support itself. At the same time, the thread protector 34 protects the external thread of the outer connector 24 from excess curable material and prevents penetration of the liquid curable material between the outer connector 24 and the compound tube 26. The material 6 is arranged to change colour to dark green when it is cured, so that a visual indication is provided when the curing process is completed.

It will be appreciated by persons skilled in the art that the above embodiment has been described by way of example only, and not in any limitative sense, and that various alterations and modifications are possible without departure from the scope of the invention as defined by the appended claims.

The invention claimed is:

1. A filler assembly for filling with curable liquid material a cable gland, the cable gland having a plurality of cores of at least one cable extending therethrough, the assembly comprising:
   (a) a dispenser apparatus for a curable liquid material, the apparatus comprising:
      a body adapted to define at least one first chamber for accommodating a first component of a curable liquid material, and at least one second chamber for accommodating a second component of said curable liquid material and adapted to communicate with at least one said first chamber to enable mixing of said first and second components to initiate curing of said curable liquid material;
      at least one first barrier apparatus for temporarily preventing mixing of said first and second components;
      at least one elongate dispenser apparatus adapted to communicate with at least one said second chamber and to dispense said mixed curable liquid material therefrom between a plurality of cores of at least one cable; and
      at least one second barrier apparatus for temporarily preventing passage of said curable liquid material from the or each said second chamber to at least one said dispenser apparatus; and
   (b) at least one flexible barrier member having at least one respective aperture therethrough adapted to stretch to engage a plurality of cores of a cable to provide a barrier to passage of said curable liquid material along said cores.

2. An assembly according to claim 1, wherein said body is flexible.

3. An assembly according to claim 1, wherein at least one said first barrier apparatus comprises at least one releasable clamp.

4. An assembly according to claim 1, further comprising a first component of a curable liquid material in at least one said first chamber, and a second component of said curable liquid material in at least one said second chamber.

5. An assembly according to claim 1, wherein the curable liquid material is adapted to change color as a result of curing thereof.

6. An assembly according to claim 1, further comprising a cover member for covering an external screw thread of a cable gland to prevent said curable liquid material coming into contact with said screw thread.

7. An assembly according to claim 6, wherein the cover member is adapted to prevent curable liquid material from penetrating an end face of the cable gland.

8. An assembly according to claim 1, wherein at least one said barrier member has a respective tapering portion.

9. An assembly according to claim 1, wherein at least one said second barrier apparatus comprises at least one releasable clamp.

10. An assembly according to claim 1, wherein the aperture is in a planar portion of the flexible barrier member.

11. An assembly according to claim 10, wherein the planar portion extends inwardly from an outer portion of the flexible barrier member that is sealed to the gland.

12. An assembly according to claim 1, wherein the flexible barrier member is elastomeric and has a central membrane portion through which the aperture extends.

13. An assembly according to claim 12, wherein the edges of the aperture are the thickness of the membrane portion.

14. A method of filling a cable gland with curable liquid material, the method comprising:
   using a filler assembly that includes:
   (a) a dispenser apparatus for a curable liquid material, the apparatus comprising:—
      a body adapted to define at least one first chamber for accommodating a first component of a curable liquid material, and at least one second chamber for accommodating a second component of said curable liquid material and adapted to communicate with at least one said first chamber to enable mixing of said first and second components to initiate curing of said curable liquid material;
      at least one first barrier apparatus for temporarily preventing mixing of said first and second components;
      at least one elongate dispenser apparatus adapted to communicate with at least one said second chamber and to dispense said mixed curable liquid material therefrom between a plurality of cores of at least one cable; and
      at least one second barrier apparatus for temporarily preventing passage of said curable liquid material from the or each said second chamber to at least one said dispenser apparatus; and
   (b) at least one flexible barrier member for having at least one respective aperture therethrough adapted to stretch to engage a plurality of cores of a cable to provide a bather to passage of said curable liquid material along said cores;
   locating at least one said barrier member in the cable gland; and
   locating an outlet of at least one said dispenser apparatus in said cable gland and dispensing curable liquid material therefrom so as to expel air from the cable gland.

15. A method according to claim 14, wherein the step of locating at least one said barrier member in the cable gland comprises locating at least one said bather member around a plurality of said cores of at least one said cable.

16. In a cable gland through which a bundle of cores of a cable extend and that is filled with a curable material so as to block the passage through the gland of gases from an explosion, the improvement wherein the gland defines a resin well at the bottom of which resides a flexible barrier member having an elastomeric membrane in a central portion thereof, the flexible barrier member sealing the bottom of the resin well except for an aperture through the membrane through which the cores extend, the aperture being smaller than the bundle of cores so that the cores stretch the aperture to fit tightly around the bundle, and wherein prior to curing the curable material is a liquid when it is placed in the well that flows in between the cores and around the bundle of cores.

17. A kit for making an explosion proof cable passage comprising a gland as claimed in claim 16 and a package of uncured curable material that is placed in the resin well.

18. The kit of claim 17, wherein the package includes a stiff tubular nozzle that can be inserted into the well along the cores next to the bottom of the well to dispense the curable material in proximity to the flexible barrier member at the bottom of the well so as to fill the well from the bottom.

19. The kit of claim 18, wherein the package contains the curable material in two separate parts and the package can be manipulated to mix the two parts in the package and dispense the mixed material through the nozzle.

* * * * *

UNITED STATES PATENT AND TRADEMARK OFFICE
CERTIFICATE OF CORRECTION

| | | |
|---|---|---|
| PATENT NO. | : 8,872,027 B2 | Page 1 of 1 |
| APPLICATION NO. | : 13/391539 | |
| DATED | : October 28, 2014 | |
| INVENTOR(S) | : Samuel Liam Proud | |

It is certified that error appears in the above-identified patent and that said Letters Patent is hereby corrected as shown below:

In the Claims

Col. 6, Line 36, Claim 14 "bather" should be --barrier--

Col. 6, Line 45, Claim 15 "bather" should be --barrier--

Signed and Sealed this
Fourteenth Day of April, 2015

Michelle K. Lee
*Director of the United States Patent and Trademark Office*